United States Patent [19]
Symons

[11] Patent Number: 6,123,795
[45] Date of Patent: Sep. 26, 2000

[54] METHOD OF PREPARING A SHEET OF A LIGNOCELLULOSIC MATERIAL FOR THE MANUFACTURE OF A FINISHED PRODUCT AND METHOD OF MANUFACTURE OF A FINISHED PRODUCT

[75] Inventor: Michael Windsor Symons, Pretoria, South Africa

[73] Assignee: Windsor Technologies Limited, Nassau, Bahamas

[21] Appl. No.: 09/125,192

[22] PCT Filed: Feb. 14, 1997

[86] PCT No.: PCT/GB97/00440

§ 371 Date: Nov. 20, 1998

§ 102(e) Date: Nov. 20, 1998

[87] PCT Pub. No.: WO97/32074

PCT Pub. Date: Sep. 4, 1997

[30] Foreign Application Priority Data

| Feb. 14, 1996 | [ZA] | South Africa | 96/1181 |
| Aug. 19, 1996 | [ZA] | South Africa | 96/7025 |
| Sep. 27, 1996 | [ZA] | South Africa | 96/8156 |
| Nov. 27, 1996 | [ZA] | South Africa | 96/9953 |

[51] Int. Cl.$^7$ ............................................. B29C 35/02
[52] U.S. Cl. .............. 156/245; 156/308.3; 156/314; 156/331.3; 156/331.7; 162/136; 427/391; 427/393
[58] Field of Search .................... 162/134, 135, 162/136; 427/391, 393; 156/245, 308.3, 314, 331.3, 331.7

[56] References Cited

U.S. PATENT DOCUMENTS

| 3,666,593 | 5/1972 | Lee ............................ 156/285 |
| 3,800,016 | 3/1974 | Roberts ........................ 264/45 |
| 3,840,396 | 10/1974 | Sommerfeld et al. . | |
| 3,974,024 | 8/1976 | Yano et al. ................... 162/101 |
| 4,026,980 | 5/1977 | Hubbard ....................... 264/50 |
| 4,122,203 | 10/1978 | Stahl .......................... 428/309 |
| 4,127,628 | 11/1978 | Uchida et al. ................ 264/42 |
| 4,172,056 | 10/1979 | Marra ......................... 260/17.2 |
| 4,306,395 | 12/1981 | Carpenter .................... 52/223 R |
| 4,332,925 | 6/1982 | Lee ............................ 528/48 |
| 4,505,778 | 3/1985 | Robertson .................... 427/391 |
| 4,722,866 | 2/1988 | Wilson et al. ................ 428/411.1 |
| 4,810,569 | 3/1989 | Lehnert et al. ............... 428/285 |
| 5,008,359 | 4/1991 | Hunter ........................ 527/103 |
| 5,258,087 | 11/1993 | Symons ....................... 156/210 |
| 5,280,097 | 1/1994 | Hunter et al. ................ 527/103 |
| 5,385,754 | 1/1995 | Earl et al. ................... 427/221 |

FOREIGN PATENT DOCUMENTS

| 3414229 A1 | 10/1985 | Germany . |
| WO 91/04291 | 4/1991 | WIPO . |
| 96/13468 | 5/1996 | WIPO . |

*Primary Examiner*—Erma Cameron
*Attorney, Agent, or Firm*—Pillsbury Madison & Sutro LLP

[57] ABSTRACT

A method of preparing a sheet of a lignocellulosic material such as paper for the manufacture of a finished product, includes the steps of impregnating the sheet with an impregnating composition comprising a composition for the chemical modification of the lignocellulosic material containing a dicarboxylic anhydride or a tricarboxylic anhydride dissolved in a suitable non-aqueous solvent, and a composition for resinating the lignocellulosic material containing an isocyanate thermosetting resin dissolved in a suitable non-aqueous solvent. Thereafter any excess of the impregnating composition is removed from the impregnated lignocellulosic material and the non-aqueous solvent or solvents are removed. Subsequently the sheet of lignocellulosic material so treated may be used in a method of forming an article by adhering a sheet so treated to a second sheet optionally so treated, with a suitable adhesive material. The result is a product which may be used as a building board or the like.

15 Claims, No Drawings

METHOD OF PREPARING A SHEET OF A LIGNOCELLULOSIC MATERIAL FOR THE MANUFACTURE OF A FINISHED PRODUCT AND METHOD OF MANUFACTURE OF A FINISHED PRODUCT

This application is the national phase of international application PCT/GB97/00440 filed Feb. 14, 1997 which designated the U.S.

BACKGROUND OF THE INVENTION

This invention relates to a method of preparing a sheet of a lignocellulosic material for the manufacture of a finished product and to a method of forming an article or finished product from one or more sheets of a lignocellulosic material so treated.

It is well known to manufacture spirally or convolutely wound paper tubing or angles, the latter referred to as edge board, from kraft paper. Such products are most frequently made by first cutting large reels of kraft paper into reels of limited widths of from 40 mm to 160 mm, and then unwinding the paper from these reels or "biscuits" for multi layer lamination, either over a mandrel in the case of spirally wound paper tubing, or across formers in the case of edge board, the glue between the layers being generally a water based polyvinyl acetate or alkali silicate. The product comes off the line continuously and can then be cut to lengths of any size. The result is a product that is fit for the purposes for which it is presently manufactured.

However, these basic shapes, i.e. tubular or angular sections, are generally not suitable for use in other applications such as high pressure pipes, ventilation pipes, replacements for aluminium extrusions, as poles or posts to hold signs, as fencing poles or posts, as irrigation pipes, or for a host of other applications where the tubular or angular sections are subjected to a greater degree of mechanical or other stress. In these cases, the paper from which the tubular or angular sections are made, must first be modified in order to provide the required degree of water resistance and mechanical strength.

In the manufacture of sheet products, i.e boards or panels, from a lignocellulosic material, it is also necessary to provide the material with the required degree of water resistance and mechanical strength.

Natural fibrous materials or lignocellulosic materials are comprised of hemi celluloses, celluloses and lignin. During the paper making process, the lignins are digested out of the composition, leaving principally the celluloses and hemi celluloses. A change in the moisture content of these materials results in swelling, as a result of their hydrophilic nature, and thus a loss in strength. The reason is that the cell wall polymers of the materials contain hydroxyl or other oxygen containing groups that attract water through hydrogen bonding. It is the hemi celluloses which are the most hygroscopic. Water can give rise to further degradation as a result of attack by micro organisms.

It is known to modify lignocellulosic materials chemically. Various classes of chemical reactions have been used with wood products and these are esters, acetals and ethers produced inter alia by the use of anhydrides.

Examples of documents which teach the use of anhydrides include U.S. Pat. Nos. 4,832,987, 5,055,247 and 5,064,592.

Examples of documents which teach the use of anhydrides to treat a cellulosic material to which there is then applied a polymer, are U.S. Pat. Nos. 5,120,776; 5,385,754 which teaches a process for modifying lignocellulosic material by a chemical treatment method, which method comprises treating the lignocellulosic material with phthalic anhydride and a thermosetting resin selected from phenol formaldehyde resins, urea formaldehyde resins and urethane resins and then curing the phthalalated resin treated product so formed; CA 119:227002; and CA 120:135905.

However, it is undesirable when preparing an article using a glue bond to use a material that gives rise to toxic volatiles or that may be toxic in itself. It is undesirable to have flammable solvents present, and in gluing paper laminates together that have been chemically modified or resinated, solvent or water carriers cannot be accommodated in the adhesive composition, because it is not possible for them subsequently to escape from the composite.

European Patent 0390536 to Plascon Technologies (Pty) Limited teaches the impregnation of spirally wound paper tubing with a thermosetting resin in an extending liquid. However, it should be noted that the impregnation of a pre-formed pipe has a number of disadvantages. In the first case, very little mass of pipe can be fitted into a vacuum/pressure/vacuum impregnation cylinder and therefore efficiencies are low; the adhesive used in the pre-winding of the pipe may be inferior for the end purpose, such as the water based polyvinyl acetates and alkali silicates; and the pre-applied adhesive mitigates against the through penetration of the impregnating composition. The advantage of pre-impregnating narrow reels or biscuits of paper or other lignocellulosic material is that the volume of the treatment cylinder can be utilised to its maximum theoretical extent, and the subsequent winding of the pre-impregnated material in which the resin may be in the "B Stage"—in other words, not necessarily fully polymerised, allows the specification of the hot melt adhesive to be devoid of solvents or water that could be trapped in the tube composite, and the resins chosen may cross link with the resin in the paper, forming an intimate bond and a cohesive whole to the composite.

U.S. Pat. No. 4,505,778 teaches a paper composition comprising cellulosic fibres chemically bonded with polyisocyanate sizing resins consisting essentially of a blend of an aromatic polyisocyanate resin containing from 1 to 10% by weight of an isocyanate terminated prepolymer having the formula $RO(CH_2CHR'O)_nCONHX$ wherein R is selected from an alkyl group containing one to four carbon atoms and a polyester condensation of a diacid and a polyether glycol, R' is selected from H or $CH_3$, n is an integer ranging from 5 to 120, and X is a residue of an aromatic di or polyisocyanate, and which contains at least one free isocyanate group. The polyisocyanate composition is applied as an aqueous emulsion to the cellulosic fibres which are then formed into paper. Alternatively, an aqueous emulsion of the polyisocyanate may be applied to the surface of the paper after its formation. It is to be emphasized that the polyisocyanate is purely used as a sizing resin and that it is always applied in an aqueous solvent or emulsion.

U.S. Pat. No. 5,280,097 discloses a laminated product which has an organic polymer layer on at least one surface of a substrate of cellulosic material impregnated with polyisocyanate. The isocyanate resin may be dissolved in a suitable miscible organic solvent, preferably one such as propylene carbonate having a high boiling point and a low flammability and toxicity.

U.S. Pat. No. 5,008,359 discloses a method of making a cellulose based polymeric material and the products of the invention. A cellulosic substrate is impregnated with an essentially uncatalysed polyfunctional isocyanate and pressed at elevated temperature and pressure. The polyisocyanate may be impregnated into the cellulosic material in either neat form or in solution with a solvent such as acetone.

U.S. Pat. No. 3,666,593 teaches a process for making a paper-overlaid panel which comprises providing a substrate and at least one layer of kraft paper, applying an organic polyisocyanate resin to the paper, and pressing the layer of paper against the substrate under closed conditions, whereby the formed carbon dioxide will be entrapped causing internal pressure to impregnate the resin into the paper and into the substrate and to bond the paper to the substrate. The polyisocyanate resin may be diluted with a solvent.

There is therefore a need for products made from lignocellulosic sheets in which the sheets have first been chemically modified and resinated and which are then laminated subsequently.

SUMMARY OF THE INVENTION

According to a first aspect of the invention there is provided a method of preparing a sheet of a lignocellulosic material for the manufacture of a finished product, which method includes the steps of:

(a) impregnating the sheet of the lignocellulosic material with an impregnating composition comprising:
  (i) a composition for the chemical modification of the lignocellulosic material comprising a dicarboxylic anhydride or a tricarboxylic anhydride selected from the group consisting of maleic anhydride, phthalic anhydride, succinic anhydride, tetrahydrophthalic anhydride and trimellitic anhydride dissolved in a suitable non-aqueous solvent selected from dichloromethane and liquid carbondioxide, and
  (ii) a composition for resinating the lignocellulosic material comprising an isocyanate thermosetting resin dissolved in a suitable non-aqueous solvent selected from dichloromethane and liquid carbondioxide,
(b) removing from the impregnated lignocellulosic material any excess of the impregnating composition; and
(c) removing the non-aqueous solvent or solvents.

The sheet of a lignocellulosic material may be for example a sheet of paper, a sheet of a composite lignocellulosic material, e.g chipboard or fibreboard, or a sheet of timber.

The suitable non-aqueous solvent in the chemical modification composition and the suitable non-aqueous solvent in the resination composition may be the same or may be different but compatible.

In step (a) the impregnation may be carried out in a suitable vacuum/pressure/vacuum impregnation apparatus or pressure apparatus. Alternatively, the impregnation may be carried by irrigating a moving web of the lignocellulosic material or by immersing the lignocellulosic material in the impregnating composition, to cause the penetration of the impregnating composition throughout the lignocellulosic material.

The impregnating composition preferably contains from 0,25% to 30% inclusive, more preferably from 0,25% to 15% inclusive of the anhydride by weight of the impregnating composition.

As the lignocellulosic material preferably takes up from 50% to 150% inclusive, more preferably from 90% to 110% inclusive of the impregnating composition by weight of the lignocellulosic material before removal of the solvent, after removal of the solvent the amount of the anhydride in the lignocellulosic material thus ranges from 0,125% to 45% inclusive by weight of the lignocellulosic material.

The impregnating composition also includes an isocyanate thermosetting resin dissolved in a suitable non-aqueous solvent. The solvent for the isocyanate resin is preferably the same as the solvent for the impregnating composition, which is preferably dichloromethane or liquid carbon dioxide, but may be a different compatible solvent.

The impregnating composition preferably contains the isocyanate thermosetting resin in an amount of from 1,5% to 60% inclusive of the isocyanate thermosetting resin by weight of the impregnating composition.

In the impregnating composition there may also be incorporated other additives such as for example a fire retardant or fire inhibitor, a bacteriostat, a fungicide, an insecticide, an ultraviolet light absorber or stabiliser, an anti oxidant, a dye, a hydrophobic agent such as a silicone or siloxane, or a wax.

In the impregnating composition there may also be incorporated materials acting as both hydrophobic agents and synergistic binders, chosen from the group comprising of bitumen, asphalt, coal tar and pitch, and which may be incorporated in an amount of from 5 to 40% by weight of the impregnating composition.

Step (b) is only carried out if there is any excess of the impregnating composition.

According to a second aspect of the invention there is provided a method of forming an article from a first sheet of a lignocellulosic material treated according to steps (a) to (c) above, and a second sheet of a lignocellulosic material optionally treated according to steps (a) to (c) above, which method includes the steps of:

(1) locating an adhesive material between the first and second sheets to adhere the first and second sheets to each other to form a layered product; and
(2) subjecting the product of step (1) to conditions suitable to set the adhesive material to form the article.

According to a third aspect of the invention there is provided a method of forming an article from a first sheet of a lignocellulosic material and a second sheet of a lignocellulosic material both treated according to steps (a) to (c) above, and a third sheet of a lignocellulosic material optionally treated according to steps (a) to (c) above and sandwiched between the first and second sheets, which method includes the steps of:

(1) locating an adhesive material between the first and second sheets and between the second and third sheets to adhere the first and second sheets and the second and third sheets to one another to form a layered product; and
(2) subjecting the product of step (1) to conditions suitable to set the adhesive material to form the article.

One or more fourth sheets of a lignocellulosic material, optionally treated according to steps (a) to (c) above, may be interposed between either of the first and second sheets or the second and third sheets, with an adhesive material being located between each fourth sheet and the adjacent first, second or third sheet to adhere the fourth sheet or sheets to the first, second or third sheets to form the layered product.

The method of the second aspect of the invention and the method of the third aspect of the invention may include a further step:

(3) after step (1) and before step (2) passing the layered product over a former to form the layered product into the shape of the article.

In this case the article may be for example a spirally wound tube formed on a suitable mandrel, or an angle or a channel or a cone section, formed on a suitably shaped former.

Alternatively, the method of the second aspect of the invention and the method of the third aspect of the invention may include a further step:

(4) prior to or simultaneously with step (1) shaping one or more of the sheets of lignocellulosic material to a desired shape, for example corrugating one or more of the sheets of lignocellulosic material.

The adhesive material may be a hot melt adhesive applied through a hot melt adhesive applicator.

Alternatively, the adhesive material may be a film of a thermoplastics material which is interlayered between two adjacent sheets of the lignocellulosic material. Heating of the film of thermoplastics material causes the film to melt and thus to adhere adjacent sheets of the lignocellulosic material to each other.

The film of thermoplastics material has preferably either been modified by irradiation or by fluorination and may be for example a film of polypropylene or polyethylene or polyvinyl chloride.

Further alternatively, the adhesive material may be a two-component thermosetting compound in liquid form, which is applied between two adjacent sheets of the lignocellulosic material, and is subsequently set to adhere the sheets to each other.

Further alternatively, the adhesive material may be a combination of an isocyanate prepolymer and a polyol applied between two adjacent sheets of the lignocellulosic material to produce a urethane foam between two adjacent sheets of lignocellulosic material, and to adhere the two adjacent sheets to each other to form the layered product.

Further alternatively, the adhesive material may be a combination of a phenol formaldehyde resole resin, a catalyst for the resin, a blowing agent and an emulsifying agent, applied between two adjacent sheets of the lignocellulosic material to produce a phenolic foam between the two adjacent sheets of lignocellulosic material, and to adhere the two adjacent sheets of the lignocellulosic material to each other to form the layered product.

In step (2) the conditions suitable to set the adhesive material to form the article will depend upon the nature of the adhesive material.

For example, when the adhesive material is a hot melt adhesive, the product of step (1) will generally be subjected to a temperature of from 60° C. to 140° C. inclusive for an appropriate length of time, typically up to four hours, in order to ensure that any resin present in the product is polymerised and/or crosslinked.

Alternatively, when the adhesive material is a film of a thermoplastics material, the conditions suitable to set the adhesive material comprise cooling after heating of the film of thermoplastics material to cause the film to melt and thus to adhere adjacent sheets of the lignocellulosic material to each other. Typical heating temperatures are in the range of 180 to 220° C.

Further alternatively, when the adhesive material is a two-component thermosetting compound in liquid form, the conditions in step (2) may be the application of heat or the like.

Further alternatively, when the adhesive material is a urethane foam or a phenolic foam, the conditions may be conditions suitable to set the urethane foam or the phenolic foam to form the article.

According to a fourth aspect of the invention there is provided a method of making an article from a sheet of a lignocellulosic material treated according to steps (a) to (c) above, which method includes the steps of:

(A) before or after step (c) passing the sheet through a former to shape the sheet into the shape of the article;

(B) then if necessary, carrying out step (c) above, i.e. removing the suitable non-aqueous solvent or solvents; and (C) then subjecting the product of step (B) to elevated temperatures to polymerise and/or cross-link the resin or resins in the product to form the article.

In step (A) the former may be for example a roller such as a corrugator.

In step (C) the product of step (B) will generally be subjected to a temperature of from 60° C. to 140° C. inclusive for an appropriate length of time, typically up to four hours, in order to ensure that any resin present in the product is polymerised and/or cross-linked.

DESCRIPTION OF EMBODIMENTS

The first aspect of the invention is a method of preparing a sheet of a lignocellulosic material for the manufacture of a finished product.

Lignocellulosic material refers to any plant material emanating from the photosynthetic phenomenon. This includes paper, linen, cotton cloth, woven hessian, and the like.

Thus, the sheet of a lignocellulosic material may be for example a sheet of paper, a sheet of a composite lignocellulosic material, e.g chipboard or fibreboard, or a sheet of timber e.g a peeled, sliced or sawn thin section of timber.

In the first aspect of the invention, the lignocellulosic material is chemically modified by impregnating the lignocellulosic material with an impregnating composition comprising a dicarboxylic anhydride such as maleic anhydride, phthalic anhydride, succinic anhydride, or tetrahydrophthalic anhydride, or a tricarboxylic anhydride such as trimellitic anhydride, dissolved in a suitable solvent.

The choice of solvent is dictated by its suitability including toxicity, ease of handling, boiling point and evaporative rate, which in turn affect its ease of recovery from the lignocellulosic material after impregnation, its inertness and therefore absence of interference chemically, flammability and danger of explosion, its solvency thereby propagating the infusion and intimate wetting of the cellular tissue of the lignocellulosic material, and finally its ease of recovery e.g by absorption in activated carbon followed by steam purging and distillation, or condensation and refrigeration or membrane or sieve technologies or optionally, in the case of liquid carbon dioxide, allowing escape to the atmosphere. Examples of suitable solvents are methyl acetate, ethyl acetate, methylethyl ketone, benzene, trichloroethylene and dichloromethane. Dichloromethane is the preferred solvent, because it is non flammable, has a boiling point of approximately 39° Centigrade and is relatively inert, and meets the other requirements of the process. In addition dichloromethane has the propensity to absorb water as a solute forming a 98% azeotrope thereby denaturing the lignocellulosic material and further propagating the latency of the isocyanates which react with hydroxyl containing compounds, notably water, to produce urethanes. The high evaporative rate of dichloromethane also propagates the more rapid evaporation of residual water.

Another suitable solvent is liquid carbon dioxide.

Liquid carbon dioxide is a supercritical fluid solvent maintained at a temperature of the order of −40° C., and a pressure of 18 atmospheres.

It is often a waste product from other processes, is non-polluting, is inexpensive, and meets the other requirements of the non-aqueous solvent.

In order to remove the carbon dioxide solvent from the lignocellulosic material, pressure is gradually released after the removal of the excess impregnating composition, and the carbon dioxide is released to the atmosphere, or recaptured for reuse.

When the solvent is removed, the residual carboxylic acid groups have a dielectric loss factor such that the modified lignocellulosic material is able to conduct electricity, thereby sustaining an electrostatic field allowing the sheet of lignocellulosic material to be electrostatically powder coated.

The reaction between the anhydride and the lignocellulosic material at elevated temperatures in the absence of solvents is an esterification reaction yielding, as an example, lignocellulosic maleate or phthalate or succinate with a residue of water. The anhydrides may be represented as follows:

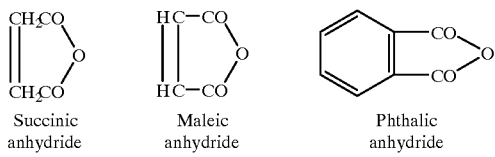

Succinic anhydride    Maleic anhydride    Phthalic anhydride

Other anhydrides such as propionic and butyric anhydride may be esterified to wood or other lignocellulosic material. The result of the reaction is effectively a lignocellulosic polyester, because in the cases of maleic anhydride, phthalic anhydride and succinic anhydride, a polymerisation takes place resulting in binding properties when the impregnated and dried material is subjected to heat and pressure, thereby complimenting the function of the resin used in this invention. In the case of maleic anhydride, the double bond opens allowing cross linking and in the case of phthalic anhydride, the ring opens initially, followed by polymerisation.

A further notable function of the anhydrides is that they scavenge any available hydroxyl groups or water, thereby further promoting the latency of the isocyanates in the impregnating liquor by preventing the reaction of these isocyanates with hydroxyl groups which would give rise to the formation of urethane polymers, and also denaturing the lignocellulosic material during the impregnation process.

A still further function of the anhydrides is that after contact with the lignocellulosic material and the removal of the solvent, the residual carboxylic acid groups catalyse the polymerisation of the isocyanates.

The impregnating composition may also include a long chain carboxylic acid such as a C10 to C50 monocarboxylic acid, preferably stearic acid, dissolved in a suitable solvent, such as methyl acetate, ethyl acetate, methylethyl ketone, benzene, trichloroethylene and dichloromethane.

A number of carboxylic acids may be esterified to wood or other lignocellulosic materials in the absence of solvents at elevated temperatures. Apart from the esterification potential, the long chain carboxylic acids with a relatively small polar group attached, tend to orientate with the polar group to the hydroxyl groups in the polymers of the lignocellulosic cell walls, with the long carbon chain orientated toward water ingress, thereby imposing hydrophobicity.

The impregnating composition preferably contains from 0,25% to 30% inclusive, more preferably from 0,25% to 15% inclusive of the anhydride by weight of the impregnating composition.

The impregnating composition also contains an isocyanate thermosetting resin dissolved in a suitable non-aqueous solvent.

Isocyanates are compounds containing the group —N=C=O and are characterised by the general formula:

wherein x is variable and denotes the number of NCO groups, and R denotes a suitable group.

Examples of organic isocyanates include aromatic isocyanates such as m- and p-phenylenediisocyanate, toluene-2,4- and 2,6-diisocyanates, diphenylmethane-4,4'diisocyanate, diphenylmethane-2,4-diisocyanate, chlorophenylene-2,4-diisocyanate, diphenylene-4,4'-diisocyanate, 4,4'-diisocyanate-3,3'-dimethyldiphenyl, 3-methyldiphenylmethane-4,4'-diisocyanate and diphenyletherdiisocyanate and 2,4,6-triisocyanatotoluene and 2,4,4'-triisocyanatodiphenylether. There may be present mixtures of isocyanates for example a mixture of toluene diisocyanate isomer such as the commercially available mixtures of 2,4- and 2,6-isomers and also the mixture of di and higher polyisocyates produced by phosgenation of aniline/formaldehyde condensates. Such mixtures are well-known in the art and include the crude phosgenation products containing mixtures of methylene bridged polyphenylpolyisocyanates including diisocyanate, triisocyanate and higher polyisocyanates together with any phosgenation by-products.

Preferred compositions are those wherein the isocyanate is an aromatic diisocyanate or polyisocyanate of higher functionality in particular crude mixtures of methylene bridged polyphenylpolyisocyanates containing diisocyanate, triisocyanate and higher functionality polyisocyanates. The methylene bridged polyphenylpolyisocyanates are well-known in the art and are sometimes referred to as polymeric methylene bridged polyphenyldiisocyanate (MDI) having an isocyanate functionality ranging from 2,5–3 and other products sometimes referred to as crude MDI having higher functionality. They are prepared by phosgenation of corresponding mixtures of polyamines obtained by condensation of aniline and formaldehyde.

Specific examples of suitable isocyanates are those having an (NCO) content percentage preferably exceeding 20%, more preferably exceeding 25%. These isocyanates promote latency or reduced reactivity because of the high number of NCO groups, and provide the maximum capacity for hydroxyl bonding. Examples are Desmadur VKS or Desmadur VK by Bayer, which are solvent free mixtures of aromatic polyisocyanates such as diphenyl methane4,4 di-isocyanate and polymeric matter. These and similar are among those referred to as MDIs in the industry. A further description used is a di-isocyanate-diphenyl methane, further examples being Suprasec DNR-5005, which is a polymeric MDI, or Suprasec 2020 which is a monomeric MDI with available NCO percentages of 30,7% and 29% and which are polymeric MDI with standard functionality and monomeric MDI respectively. The Suprasec resins are supplied by ICI. A further example of a crude MDI is Voronate M 229 by Dow Chemical Company.

Further suitable di-isocyanates are the toluene di-isocyanates with the alternative names tolylene di-isocyanate or toluylene di-isocyanate with the abbreviation TDI, such as Desmadur L75 by Bayer.

A further example of the principle of wood esterification is the use of ethyl isocyanate which reacts with hydroxyl groups to form ethyl carbamate (urethane) according to the formula:

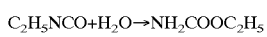

The isocyanate resins are fully soluble in dichloromethane and react with the hydroxyl groups on the cellulose and hemi cellulose molecules of the lignocellulosic material to form a wood ester. In this way they form a chemical bond adhesion rather than a cohesive adhesion. They are therefore effective in contributing not only to a reduction in water sensitivity but also to superior binding. In addition, they scavenge any carboxyl groups which are residual from the carboxylic acid derived from the anhydride. The isocyanate resins lend themselves to synergistic binding of composites and to the propagation of superior mechanical properties by a two way linkage with the residue of the anhydrides and the hydroxyl groups on the lignocellulosic material itself.

The solvent may be any suitable solvent and is preferably dichloromethane or liquid carbon dioxide, the isocyanate thermosetting resin being dissolved in the solvent at a concentration of from 1,5% to 60% by weight, more preferably at a concentration of from 2,5 to 50% by weight of the impregnating composition.

After the treatment of the lignocellulosic material with the impregnating composition and after removal of excess impregnating composition, if any, the solvent or solvents are recovered for reuse. The isocyanate thermosetting resin is left on and in the lignocellulosic material either in a latent condition or more generally in a partially polymerised condition as a result of the temperatures reached during and after the solvent removal stage, ready for subsequent complete polymerisation when subjected to the appropriate conditions of heat and optionally pressure.

This may occur, for example, in step (2) of the methods which form the second and third aspects of the invention.

The lignocellulosic material may be impregnated with the impregnating composition in any suitable manner. An example of one method of impregnation is set out below.

The lignocellulosic sheet material (in the form of paper), cut into narrow rolls of from 40 mm to 160 mm in width and diameters of up to 1½ metres, may be impregnated by placing them in an impregnation cylinder or autoclave. The cylinder is then sealed and subjected to a vacuum. This exhausts all air from the lignocellulosic material and from between the windings in the rolls. The vacuum line is isolated and the impregnating liquor is cascaded into the cylinder until full. Pressure is now exerted either hydraulically or pneumatically to ensure through impregnation uniformly throughout the mass of the material. The cylinder is drained and the charge is subjected to a post vacuum in order to remove all excess impregnating liquor which is also returned to its receptacle. The charge is now subjected to induced heat, in order rapidly to evaporate the solvent. The heat induction may be by heating coils around the cylinder or alternatively by the introduction of hot air circulating around the charge serving both to convey heat and to carry the rapidly evaporating solvent, or by microwave or by any combination. The solvent laden air passes from the cylinder, over condensation coils onto which the solvent condenses and thence again past the heating elements, and back into the cylinder on a closed loop. Mechanical compression may also be used to further facilitate condensation. As the process of the recovery of solvents nears completion, the residual air is then preferably passed through activated carbon or through a membrane in order to "polish" the emitted air to conform to emission standards.

In the case of carbon dioxide, controlled pressure release is followed by the heating of the charge to induce completion of the chemical reaction.

Where the lignocellulosic sheet material is to be impregnated and then shaped before the recovery of the solvent, it may optionally be immersed in the impregnating composition, then withdrawn to allow drainage, followed by shaping, followed by solvent recovery, followed by heating, to induce resin polymerisation or cross-linking as the case may be.

In step (a) there may also be incorporated in the impregnating composition other additives such as for example a fire retardant such as hexachlorophthalic anhydride, or a fire inhibitor, a bacteriostat, a fungicide, an insecticide, an ultraviolet light stabiliser or absorber, an anti-oxidant, a hydrophobic agent such as a silicone or siloxane, a carboxylic acid or an oil or a dye.

In particular the impregnating composition may also contain a light fast dye in an amount of from 0,005% to 0,5% inclusive of the light fast dye by weight of the impregnating composition.

A dye is generally used to colour light coloured soft woods such as for example a light coloured coniferous wood such as pine. Preferably, the dye has a light fastness of 6 or greater in the light stability range of from 0 to 8. Examples of suitable dyes are those by Sandoz sold under the brand name Clariant Savinyl.

In step (a) there may also be included in the impregnating composition other additives for the purpose of imposing hydrophobic properties as well as synergistic binding, chosen from the group comprising bitumen, asphalt, coal tar and pitch. The bitumen is preferably one with a softening temperature in excess of 90° C. and a penetration index of 10 or lower. These bitumens are preferably those that have been blown and may be modified with styrene butadiene styrene block copolymer and the like, to improve their behaviour in weather exposure.

The second aspect of the invention is a method of forming an article from a first sheet of a lignocellulosic material treated according to steps (a) to (c) above, and a second sheet of a lignocellulosic material optionally treated according to steps (a) to (c) above, which method includes the steps of locating an adhesive material between the first and second sheets to adhere the first and second sheets to each other to form a layered product, and subjecting the product to conditions suitable to set the adhesive material to form the article.

The third aspect of the invention is a method of forming an article from a first sheet and a second sheet of a lignocellulosic material both treated according to steps (a) to (c) above, and a third sheet of a lignocellulosic material optionally treated according to steps (a) to (c) above, and sandwiched between the first and second sheets, which method includes the steps of locating an adhesive material between the first and second sheets and between the second and third sheets to adhere the first and second sheets and the second and third sheets to one another to form a layered product, and subjecting the product to conditions suitable to set the adhesive material to form the article.

In addition, one or more fourth sheets of a lignocellulosic material optionally treated according to steps (a) to (c) above may be interposed between the first and second sheets or the second and third sheets in the methods described above.

The method of the second aspect of the invention and the method of the third aspect of the invention may include a further step:

(3) after step (1) and before step (2) passing the layered product over a former to form the layered product into the shape of the article.

In this case the article may be for example a spirally wound tube formed on a suitable mandrel, or an angle or a channel or a cone section, formed on a suitably shaped former.

Alternatively, the method of the second aspect of the invention and the method of the third aspect of the invention may include a further step:

(4) prior to or simultaneously with step (1) shaping one or more of the sheets of lignocellulosic material to a desired shape, for example corrugating one or more of the sheets of lignocellulosic material.

For example, one or more of the sheets of lignocellulosic material, treated according to steps (a) to (c) of the method of the first aspect of the invention may be corrugated before being subjected to the method of the second aspect of the invention or the method of the third aspect of the inventnion.

In addition, corrugation of one or more of the sheets of lignocellulosic material may occur simultaneously with the application of the adhesive material between the various sheets of lignocellulosic material.

The adhesive material may be a hot melt adhesive applied through a hot melt adhesive applicator in the form of a ribbon or film. Generally, the hot melt adhesive is applied at temperatures of the order of 180° C. The adhesive may consist of a hard resin with, for example, an ethylene vinyl acetate copolymer and a hard wax. An example of a hot melt adhesive is Henkel Technomelt TU 2210 with a melt viscosity of 600 centipoise at 160° C.

An example of the use of a hot melt adhesive for the production of spirally wound tubing is given below and includes the steps of:

(i) placing two or more reels or "biscuits" of treated lignocellulosic material on carriers, winding the sheet material from the reels through a hot melt adhesive applicator machine, whereby one surface of the lignocellulosic material has applied to it a ribbon or a film of hot melt adhesive. The hot melt adhesive is applied at temperatures of the order of 150° C. The adhesive may consist of a hard resin with, for example, an ethylene vinyl acetate copolymer and a hard wax. Application rate is a film weight of 20 to 70 g per $m^2$ of lamina surface;

(ii) winding the treated strips of lignocellulosic material onto a mandrel whilst being pressed by high tensile moving belts which bring successive plys into intimate contact with each other at high pressure before the hot melt adhesive solidifies by cooling, to form a spirally wound tube, the tube having ply numbers of from 3 to 40 or more, and being wound continuously;

(iii) finally cutting the tube formed to whatever appropriate length is required;

(iv) applying to the formed tube, coatings or liners chosen from the group comprising liquid spray applied coatings, centrifically cast lining, extruded lining and resin modified fibre windings, or over placement of thin walled metal, plaster or inorganic material tubing or liner placement of such material or both.

Alternatively, the adhesive material may be a film of a thermoplastics material which is interlayered between two adjacent sheets of the lignocellulosic material. Heating of the film of thermoplastics material causes the film to melt and thus to adhere adjacent sheets of the lignocellulosic material together.

The film of thermoplastics material has preferably either been modified by irradiation or by fluorination and is preferably a polypropylene film in the latter case (fluorination) or a polyethylene film in the former case (irradiation).

In this regard, the polypropylene film may have a weight in the region of 50 g/$m^2$, which film has high tear strength and puncture resistance, excellent resistance to low temperatures, is dimensionally stable under varying atmospheric humidities, and is sealable by heat. The film also has low vapour permeability, is water repellant, is resistant to oils or greases, is physiologically harmless, is neutral in odour and taste, and is resistant to acids and alkalis and to tropical conditions. It also has high mechanical strengths and as a part of the resulting product contributes to much improved mechanical properties.

An example of a suitable polypropylene film is Trespaphan GND by Hoechst.

The film may also be laminated to the sheets of lignocellulosic material using one or two component adhesives which are solvent free. Seal temperature is typically about 140° C. Typical suitable film thicknesses are from 20 microns to 150 microns.

As a further alternative, the film of a thermoplastics material may be a film of polyvinyl chloride, of typical thickness of 50 to 200 microns and which has optionally been modified by irradiation or fluorination to propagate adhesion.

The film of a thermoplastics material is preferably modified by irradiation or fluorination in order to propagate cross linking and adhesion to the lignocellulosic material.

In the case of irradiation, the thickness of the film may be between 5 and 3,000 microns. The thermoplastic film or sheet is made through the conversion of a suitable thermoplastic polymeric starting material, modified with ionising radiation prior to conversion to the film or sheet. The ionising radiation employed can be produced either by a suitable radio active isotope, such as cobalt-60, or a suitable electron beam accelerator which generates energetic electrons with an energy of 50 keV to 10 MeV. The absorbed radiation dose applied to the thermoplastic polymeric starting material may be of the order of 4 to 150 kGy, and conventional electron beam accelerators or gamma irradiators can be employed for this purpose.

In the case of fluorination, the pre made film is fluorinated with fluorine gas preferably diluted with either oxygen or nitrogen or other gas, up to the level of 99%. Fluorine is a very strong oxidising agent and the process of fluorination induces the bonding of reactive groups to the polymer which in turn induces adhesion.

In both cases, the modification of the thermoplastic material improves the properties of the interlayer film for the purposes of the invention.

After the film has been located between two adjacent sheets of the lignocellulosic material to form the layered product, the layered product may be passed over a former at which point the film of the thermoplastics material is heated by for example radiofrequency or infrared or microwave heating, and thus melts or softens sufficiently to adhere the two adjacent sheets to each other to form the layered product. In this case, the conditions in step (2) will be the subsequent cooling of the product.

In an alternative, the film of the thermoplastics material may be flamed just before making contact with the lignocellulosic material, again to adhere two adjacent sheets of the lignocellulosic material to each other.

The use of a film of a thermoplastics material as an adhesive material has a number of advantages, including the fact that such a film is impervious to water, and it imposes a toughness and resilience on the product thereby imposing the advantages of a polymer film on the advantages of a resinated lignocellulosic material. For example, resistance to hail damage or other impact is improved.

As another alternative, the adhesive material in step (1) may be a two-component thermosetting compound in liquid form which may be applied for example through suitable mixer application heads. In this case, the conditions in step (2) may be the application of heat or the like.

An example is 25% Suprasec 5005 by ICI with 75% by weight of a suitable polyol compound such as 1003 by Industrial Urethanes of South Africa.

Further alternatively, there is applied a combination of an isocyanate prepolymer and a polyol between each pair of adjacent sheets to form a urethane foam between the adjacent sheets and to adhere the two or more sheets to one another to form a layered product.

The two components, i.e the isocyanate prepolymer and the polyol may be mixed and then applied to the sheets by a fixed or traversing spray device. Thereafter the adjacent sheets are laminated to each other and the layered product is then optionally passed over or between a former to form the layered product into the shape of the article, whereafter the product is subjected to conditions suitable to set the urethane foam to form the article.

For example, the combination may be administered to a moving sheet of paper in an automatic laminating line by head mixing the components in a fixed or traversing spray device, such that the generation of the interlayer foam is very rapidly achieved, foaming between the sheets of paper, which then traverse between calibrating or forming surfaces to determine the final thickness and/or shape of the product, during which time the urethane foam adheres to the sheets of paper such that on exiting the calibrating or forming surfaces, the product is of a uniform thickness and a stable consistency, resisting warping, and which can then be cut to appropriate length and/or width. An example of such a machine is an isobaric double belt continuous press by Hymmen International of Bielefeld, Germany.

The isocyanate prepolymer is preferably an MDI, being an isocyanate compound containing the group —N=C=O, as described above.

The polyol may be a hydroxyl terminated polyether or a hydroxyl terminated polyester. The polyethers are typically made by the addition of alkaline oxide, e.g. propylene oxide to alcohol or amines which are usually called starters or initiators. The polymerisation of the alkaline oxide occurs either with basic or acid catalysis, usually with basic catalysis. In order to achieve the correct reactivities, the polyethers or polyesters contain a suitable mixture of secondary hydroxyl end groups and primary hydroxyl end groups.

A typical combination for use in the method of the invention is 50% of Suprasec 5005 by ICI, mixed with 50% of polyol 826 by Industrial Urethanes of South Africa. Typical densities of the foam produced by this combination are from 35–150 kg/m$^3$, more preferably from 40 to 90 kg/m$^3$.

An example is a ceiling board comprising 250 g/m$^2$ high bulk chip recycled paper on either side of a foam core. The paper is modified with 15% Suprasec 5005 by ICI and 6% maleic anhydride on the weight of the paper and has a nominal thickness of 0,5 mm per sheet with an interlayer of 6 mm of foam between the sheets, this foam having a density of 40 g/mm thickness/m$^2$. The MDI foam may optionally be based upon Suprasec 5005 by ICI 50% and Polyol 826 by Industrial Urethanes, South Africa, or a phenolic closed cell foam, or Cellobond K in situ pourable by BP Chemicals Ltd., UK.

The urethane foam serves not only to separate the sheets of lignocellulosic material but also securely to bond the sheets to one another. This bond may be further propagated by the cross-linking of the urethane foam with free carboxylic acid groups and NCO groups in the modified lignocellulosic material.

In another alternative a combination comprising a phenol formaldehyde resole resin, a catalyst for the resin, a blowing agent and an emulsifying agent, is applied between each pair of adjacent sheets to form a phenolic foam between the adjacent sheets and to adhere the two or more sheets to one another to form a layered product.

The combination of components may be applied to the sheets of lignocellulosic material as described above.

The components of the composition which produce the phenolic foam generate heat as a function of the commencement of condensation under the action of the acid catalyst. As this commences, the vaporisation of the blowing agent takes place and further heat induction may be indicated in order to form the cured foam as quickly as possible.

The advantage of a phenolic foam is that it does not support combustion, it is rigid, it is dimensionally stable, it is relatively water resistant.

An example of an appropriate phenolic foam is Cellobond K by BP Chemicals Ltd., of the UK. Cellobond in situ is a pourable foam system used in combination with BP catalysts and suitable flowing agents, which forms a high quality insulating closed cell foam with exceptional thermal properties 0,020 Wn$^2$K and excellent fire properties with good adhesion to the modified lignocellulosic outer lamina.

Each foam system has its own advantages, but in each case the chemically modified and resinated lignocellulosic product is light, strong, rigid, stable and economic to produce.

The conditions in step (2), suitable to set the adhesive material to form the article, will generally also be conditions suitable to cause complete polymerisation of the isocyanate resin in the lignocellulosic material. These conditions generally include heat and optionally also pressure. For example, the layered product produced in step (1) may be compressed and/or heated in a suitable press at temperatures of between 120° C. and 250° C. inclusive, preferably in the range of 180° C. to 220° C. inclusive, and at pressures of from 1,96–19,61 MPa (2 to 20 kg/cm$^2$) inclusive.

A suitable press is for example a double belt laminating press.

These conditions will cause complete polymerisation of the isocyanate resin in the lignocellulosic material.

Before the first step of the method of forming an article from two or more sheets of a lignocellulosic material treated or optionally treated according to steps (a) to (c) above. there may be applied to one or more surfaces of the sheets of lignocellulosic material a powder coating.

Alternatively, the product produced by the method of forming an article as described above, may have a sheet or sheets of polypropylene or polyethylene film, which may have been printed, pigmented, coated or modified by fluorination, adhered to one or more surfaces of the product, to prevent humidity uptake in use.

Further alternatively, one or more surfaces of the product may have applied thereto a clear coating. Such a coating may be applied by roller with intermediate sanding and ultraviolet light cure. Successive coatings may be applied until the appropriate degree of build and beauty is imposed.

When the product produced is a flat product, it may be for example a board for use in the building industry as a flooring board or as a panelling board, or as a board used for construction or for the manufacture of furniture or the like.

Examples of such boards include:

(1) a board comprising two sheets of lignocellulosic material with a foam core between them. The sheets of lignocellulosic material may be kraft paper treating according to steps (a) to (c) above, and the foam may be an MDI foam, or a phenolic closed cell foam.

(2) a board as described in paragraph (1) above, but having two sheets of lignocellulosic material adhered to each other on either side of the foam core.

(3) a board comprising 2, 3 or 4 sheets of lignocellulosic material, one or more of the sheets having been treated to according to steps (a) to (c) above, the sheets being adhered to one another with a hot melt adhesive or with a two-component adhesive, or with a film of a thermoplastics material. Again the sheets of lignocellulosic material may be paper, e.g kraft paper, or thin sheets of timber, or a combination thereof.

(4) a board as in paragraph (3) above, wherein the lignocellulosic material is paper and the sheets are corrugated.

(5) a board as in paragraph (4) above, sandwiched between two or more sheets of lignocellulosic material treated according to steps (a) to (c) above.

When the product is the shaped product, it may be for example spirally wound paper tubing, or an angle or channel section or the like.

The third aspect of the invention is a process of making an article from a sheet of a lignocellulosic material treated by steps (a) to (c) above.

This method includes the step of forming the sheet into a shape such as a corrugated board either by pressing or by rolling, and thereafter, if necessary, removing the suitable non-aqueous solvent from the impregnated and shaped sheet. Thereafter the impregnated and shaped sheet of lignocellulosic material is subjected to an elevated temperature to induce the polymerisation and/or cross-linking of the resin in the article.

What is claimed is:

1. A method of preparing a sheet of lignocellulosic material for the manufacture of a finished product which preparation method includes the steps of:
   (a) impregnating the sheet of the lignocellulosic material with an impregnating composition, optionally in excess and comprising:
      (i) a composition for the chemical modification of the lignocellulosic material comprising a dicarboxylic anhydride or a tricarboxylic anhydride selected from the group consisting of maleic anhydride, phthalic anhydride, succinic anhydride, tetrahydrophthalic anhydride and trimellitic anhydride dissolved in a non-aqueous solvent selected from dichloromethane and liquid carbondioxide, and
      (ii) a composition for resinating the lignocellulosic material comprising an isocyanate thermosetting resin dissolved in a non-aqueous solvent selected from dichloromethane and liquid carbondioxide,
   (b) removing from the impregnated lignocellulosic material any excess of the impregnating composition; and
   (c) removing the non-aqueous solvent or solvents.

2. A method according to claim 1 wherein the composition for the chemical modification of the lignocellulosic material contains from 0.25% to 30% inclusive of the anhydride by weight of the impregnating composition.

3. A method according to either of claims 1 or 2 wherein the composition for resinating the lignocellulosic material contains the isocyanate thermosetting resin in an amount of from 1.5% to 60% inclusive of the isocyanate thermosetting resin by weight of the impregnating composition.

4. A method of forming an article from a first sheet of a lignocellulosic material treated according to the preparation method of claim 1, and a second sheet of a lignocellulosic material optionally also treated according to said preparation method, which method of forming includes the steps of:
   1) locating an adhesive material between the first and second sheets to adhere the first and second sheets to each other to form a layered product; and
   2) subjecting the product of step (1) to conditions suitable to set the adhesive material to form the article.

5. A method of forming an article according to claim 4, in which a third sheet of a lignocellulosic material, optionally treated according to said preparation method is sandwiched between the first and second sheets, which method of forming an article includes the steps of:
   1) locating an adhesive material between the first and second sheets and between the second and third sheets to adhere the first and second sheets and the second and third sheets to one another to form a layered product; and
   2) subjecting the product of step (1) to conditions suitable to set the adhesive material to form the article.

6. A method according to claim 5 wherein one or more fourth sheets of a lignocellulosic material, also optionally treated according to said preparation method, is interposed between either of the first and second sheets or the second and third sheets, with an adhesive material being located between each fourth sheet and the adjacent, first, second or third sheet to adhere the fourth sheet or sheets to the first, second or third sheets to form the layered product.

7. A method according to claim 4 which includes the step of:
   (3) after step (1) and before step (2) passing the layered product over a former to form the layered product into the shape of the article.

8. A method according to claim 4 which includes the step of:
   (4) prior to or simultaneously with step (1) shaping one or more of the sheets of lignocellulosic material to a desired shape.

9. A method according to claim 4 wherein the adhesive material is a hot melt adhesive applied through a hot melt adhesive applicator.

10. A method according claim 4 wherein the adhesive material is a film of a thermoplastics material which is interlayered between two adjacent sheets of the lignocellulosic material.

11. A method according to claim 10 wherein the film of the thermoplastics material has been modified by irradiation or fluorination and is selected from the group consisting of a polypropylene film, a polyethylene film and a polyvinyl chloride film.

12. A method according to claim 4 wherein the adhesive material is a two-component thermosetting composition in liquid form which is applied between two adjacent sheets of the lignocellulosic material and is subsequently set to adhere the sheets to each other.

13. A method according to claim 4 wherein the adhesive material is a combination of an isocyanate prepolymer and a polyol applied between two adjacent sheets of the lignocellulosic material to produce a urethane foam between two adjacent sheets of lignocellulosic material and to adhere the two adjacent sheets to each other to form the layered product.

14. A method according to claim 4 wherein the adhesive material is a combination of a phenol formaldehyde resole resin, a catalyst for the resin, a blowing agent and an emulsifying agent, applied between two adjacent sheets of the lignocellulosic material to produce a phenolic foam between the two adjacent sheets of lignocellulosic material, and to adhere the two adjacent sheets of the lignocellulosic material to each other to form the layered product.

15. A method of making an article from a sheet of a lignocellulosic material treated according to the method of claim 1, which method of making said article includes the steps of:

(A) before or after step (c) passing the sheet through a former to shape the sheet into the shape of the article;

(B) then if necessary, carrying out step (c) above; and (C) then subjecting the product of step (B) to elevated temperatures to polymerise and/or cross-link the resin or resins in the product to form the article.

* * * * *